United States Patent
Lowry

(10) Patent No.: US 6,618,529 B2
(45) Date of Patent: Sep. 9, 2003

(54) TILED FIBER OPTIC DISPLAY APPARATUS

(75) Inventor: Brian C. Lowry, Emlenton, PA (US)

(73) Assignee: Transvision, Inc., Pittsburgh, PA (US)

( * ) Notice: Subject to any disclaimer, the term of this patent is extended or adjusted under 35 U.S.C. 154(b) by 0 days.

(21) Appl. No.: 10/073,837

(22) Filed: Feb. 11, 2002

(65) Prior Publication Data

US 2002/0097967 A1 Jul. 25, 2002

Related U.S. Application Data

(63) Continuation of application No. 09/942,150, filed on Aug. 29, 2001, now abandoned, which is a continuation of application No. 09/482,290, filed on Jan. 13, 2000, now Pat. No. 6,304,703.

(51) Int. Cl.[7] .............................. G02B 6/04; G09F 13/18
(52) U.S. Cl. ........................ 385/120; 385/115; 385/116; 385/121; 385/147; 385/901; 385/1; 40/546; 40/547; 345/32; 345/40; 345/55
(58) Field of Search .................................. 385/115, 116, 385/120, 121, 147, 901, 42, 1, 2, 3; 40/546, 547; 345/32, 40, 55; 359/451, 10, 11

(56) References Cited

U.S. PATENT DOCUMENTS

| | | | | |
|---|---|---|---|---|
| 3,295,910 A | * | 1/1967 | Hourdiaux | 359/451 |
| 3,644,922 A | * | 2/1972 | James et al. | 345/32 |
| 3,815,986 A | * | 6/1974 | Darbee | 355/1 |
| 3,853,658 A | * | 12/1974 | Ney | 156/180 |
| 4,116,739 A | * | 9/1978 | Glenn | 156/169 |
| 4,417,412 A | * | 11/1983 | Sansom | 40/547 |
| 4,650,280 A | * | 3/1987 | Sedlmayr | 385/120 |
| 4,738,510 A | * | 4/1988 | Sansom | 385/116 |
| 4,929,048 A | * | 5/1990 | Cuypers | 385/116 |
| 5,129,028 A | * | 7/1992 | Soltan | 385/120 |
| 5,293,437 A | * | 3/1994 | Nixon | 385/115 |
| 5,376,980 A | * | 12/1994 | Gersuk et al. | 353/94 |
| 5,381,502 A | * | 1/1995 | Veligdan | 385/115 |
| 5,400,178 A | * | 3/1995 | Yamada et al. | 359/449 |
| 5,642,449 A | * | 6/1997 | Phillips | 385/33 |
| 5,818,998 A | * | 10/1998 | Harris et al. | 385/901 |
| 5,832,168 A | * | 11/1998 | Yenter | 385/147 |
| 5,911,024 A | * | 6/1999 | Wallace | 385/120 |
| 6,219,184 B1 | * | 4/2001 | Nagatani | 359/472 |
| 6,396,985 B2 | * | 5/2002 | Lowry et al. | 385/120 |
| 2002/0097230 A1 | * | 7/2002 | Lowry et al. | |
| 2002/0097967 A1 | * | 7/2002 | Lowry | |
| 2002/0097978 A1 | * | 7/2002 | Lowry et al. | |
| 2002/0105480 A1 | * | 8/2002 | Lowry et al. | |

* cited by examiner

*Primary Examiner*—Brian Healy
(74) *Attorney, Agent, or Firm*—James M. Singer; Pepper Hamilton LLP

(57) ABSTRACT

A fiber optic display apparatus consists of a plurality of optical fibers which convey a projected image from an input, or first surface, to a display, or second surface, whose area is greater than or equal to that of the first surface, such that any image projected on to the first surface appears enlarged on the second surface. The second surface is comprised of tiles which attach to adjoining tiles by means of flexible tabs and pliable locator rods in such a fashion as to allow the second surface to follow general contours (e.g. concave or convex), while the optical fiber bundles from each tile are collected into a fixture to form the first planar surface. Because of the modular design of the display it can be assembled or disassembled rapidly. A light-diffusing thin sheet or film is applied to the front of each tile of the second surface to effectively increase the numerical aperture of each fiber, thus producing a uniform wide-angle distribution of light from each fiber end and enabling viewing from any angle in front of the display.

17 Claims, 8 Drawing Sheets

FIG. 4A
Front/Back View
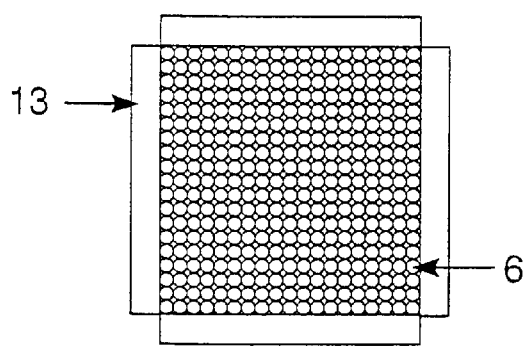
FIG. 4B
Side View
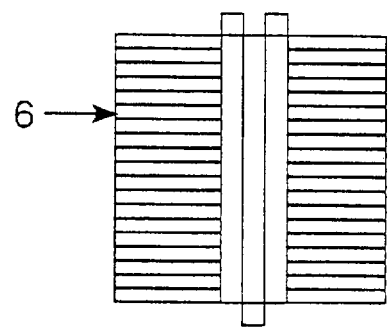
FIG. 4C
Top View
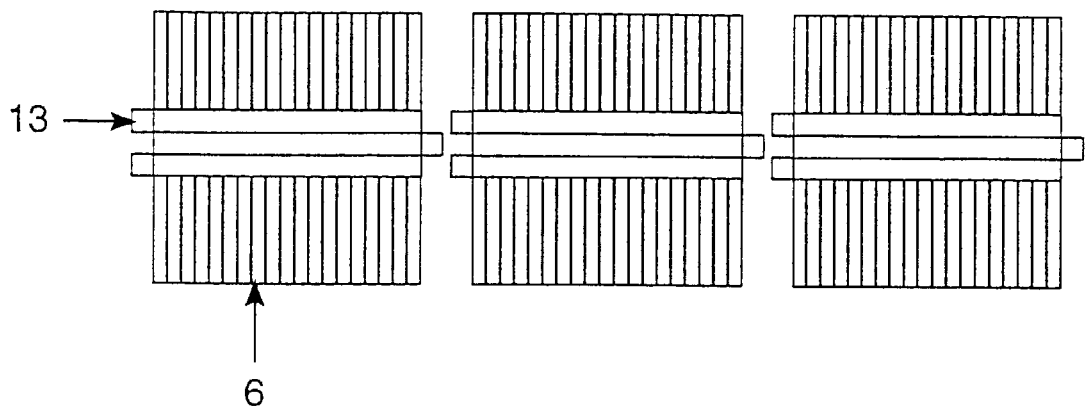
FIG. 4D
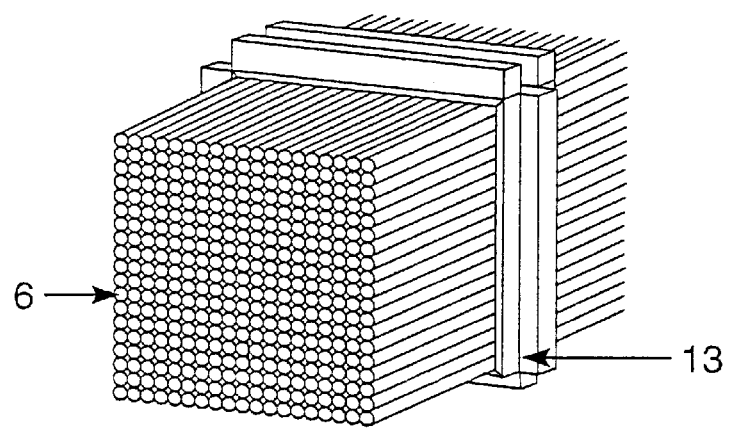
FIG. 4

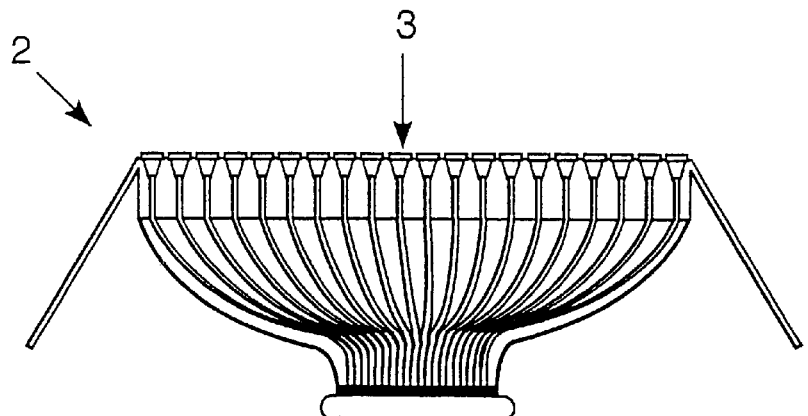
FIG. 7A
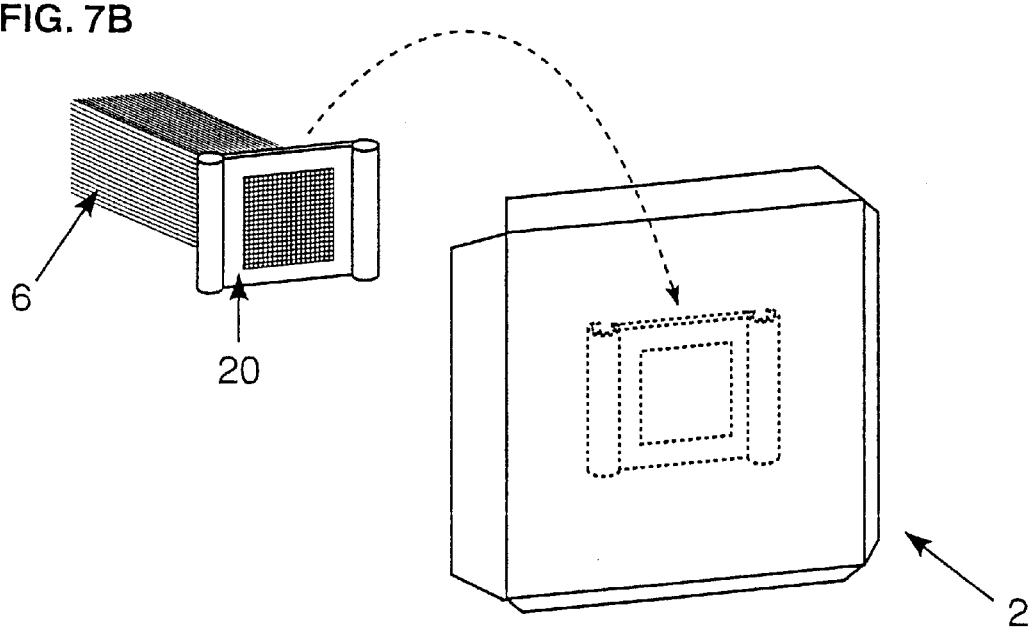
FIG. 7B
FIG. 7

TILED FIBER OPTIC DISPLAY APPARATUS

This application is a continuation of the U.S. patent application entitled "Tiled Fiber Optic Display Apparatus", filed Aug. 29, 2001, having a Ser. No. 09/942,150, abandoned which was a continuation of the U.S. patent application entitled "Tiled Fiber Optic Display Apparatus", filed Jan. 13, 2000, having a Ser. No. 09/482,290, now U.S. Pat. No. 6,304,703. Priority to each of the above-described applications is hereby claimed, and the disclosure of each is hereby incorporated by reference.

BACKGROUND OF THE INVENTION

1. Field of the Invention

According to Stanford Resources, the Large Screen Display (LSD) market will generate revenues of nearly $4 billion annually by 2002[1]. LSD's are typically used in sports stadia and arenas, airports, casinos, and areas of high pedestrian and vehicular traffic. High initial cost, high maintenance costs, installation requirements, and lack of robustness have prevented current LSD technologies from more quickly penetrating the marketplace. Moreover, current LSD technology is limited to two dimensions (i.e. planar displays), and thus is not as appealing for new LSD uses such as interactive gaming and immersive environments such as simulators, and integration with architectural structures.

[1]"Large Screen Information Displays—Market Trends, Technologies—Applications," Third Edition 1995–96, Standard Resources, Inc.

Fiber optic LSD's offer substantial improvements over current CRT- and LED-based displays, due to their smaller depth, lighter weight, and elimination of sensitive and expensive electronic components on the surface of the display. Because the displayed image is generated by a data/video projector, LCD panel, or other equivalent spatial light modulator, fiber optic displays are not "resolution bound" as are LED and CRT displays, which are comprised of a fixed number of RGB pixels on the display surface. Furthermore, fiber optic LSD's generate neither heat nor EMI at the display surface.

Fiber optic displays, however, are not without shortcomings. One of the most difficult technical problems of LSD's is the tiling or "shingling" effect due to slight misalignment of the many tiles of which the display is comprised. This problem is made worse in fiber optic displays, where it is imperative that the fibers terminate on the display at precisely right angles. Without such precise termination, the displays appear to lack uniformity in brightness. Since the human visual system is very adept at pattern recognition, means must be taken to mitigate the effects of the inter-tile mullions as well as the alignment and termination of the fiber terminals.

2. Description of Related Art

Several LSD's have been successfully constructed using optical fiber, and modular displays have been patented. However, because of the method by which the modules are joined, as well as the lack of a suitable light-shaping diffusion element at the display surface, current displays cannot be contoured.

The use of smaller tiles is based upon the concept of a "throw-away" display. In other words, if one or more of the tiles are damaged (e.g., by the impact of a rock or other hard object), they can be discarded and replaced in the field at minimal cost, without dismantling the entire display.

U.S. Pat. No. 5,892,168 discloses a fiber optic display comprised of modules which can be adjusted both horizontally and vertically to eliminate the shingling effect. Because of the two-dimensional alignment mechanism, contoured display surfaces are not feasible with this invention. No lensing process is discussed in this patent, a feature that is essential for contoured displays.

U.S. Pat. No. 5,818,998 discloses a portable fiber optic LSD. The specific embodiment disclosed is not modular, however, and may only be contoured by wrapping it around a contoured object.

U.S. Pat. No. 5,381,502 discloses a thin or curved display comprised of fixed waveguides. Because of its reliance on a scanning device, such as a laser, for producing the image, the physical dimensions and contours of the display are limited. As with the preceding patent, the display is not modular.

BRIEF SUMMARY OF THE INVENTION

A novel solution to many of these limitations is the intent of the present invention. A contourable fiber optic display apparatus comprised of modular tiles is disclosed. Despite the possible contours introduced by the tiles, the display can be viewed from any angle because the luminance from each tile is essentially constant. The application of the light diffusing film obscures each distal fiber end to the point that the human eye cannot detect small tile misalignments or mullions. Moreover, the small, lightweight tiles are comprised entirely of rugged materials and plastic optic fiber, making the display ideal for "harsh" environments. A method of construction is described which allows the display tiles to be semi-permanently joined by flexible members such that the entire LSD can be quickly set up and taken down and can be easily stored in a small place for transport. Such a display is ideal for military field use for outdoor sporting events and for trade shows. Permanent displays can be fabricated as well.

BRIEF DESCRIPTION OF DRAWINGS

FIG. 4E shows how the fiber bundle collars are attached to each other and to the secondary input matrix.

FIG. 7 shows two views; a top (FIG. 7A); and front perspective (FIG. 7B) of a simple mechanism for quickly connecting optical fiber bundles to display tiles.

DETAILED DESCRIPTION OF THE INVENTION

Figure 1:
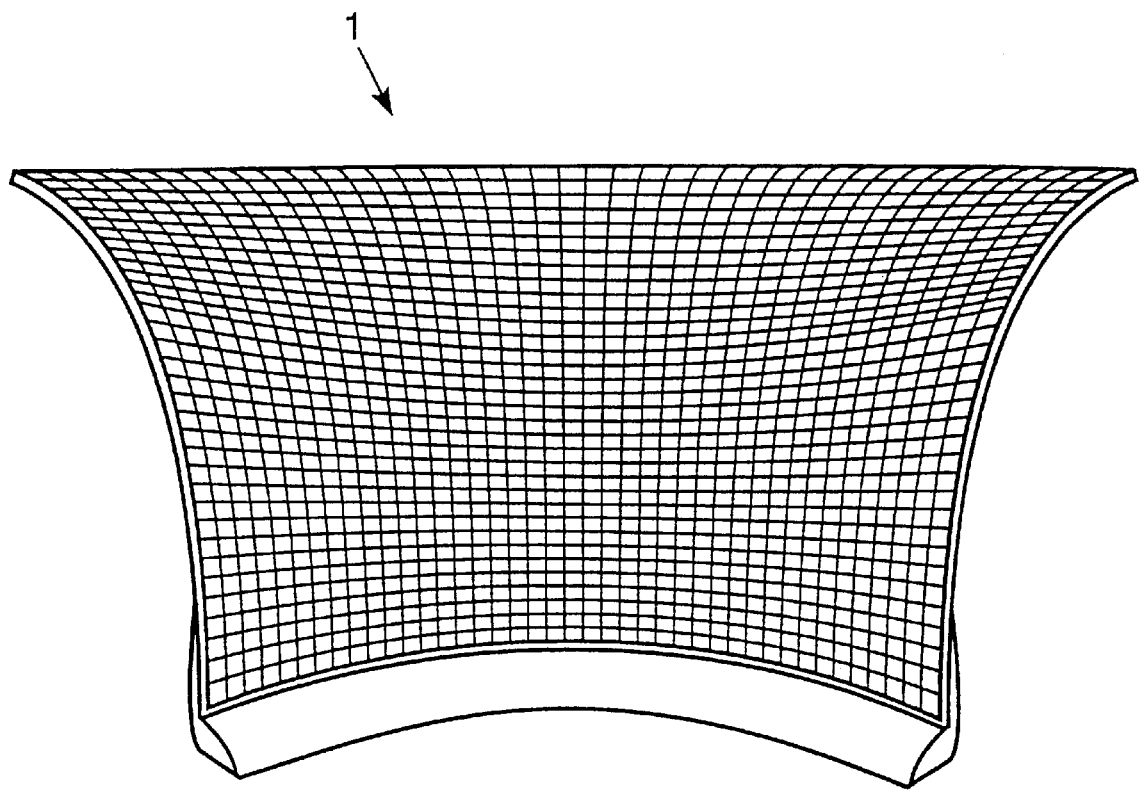
FIG. 1 depicts an example of a contoured large screen display.
Figure 2:
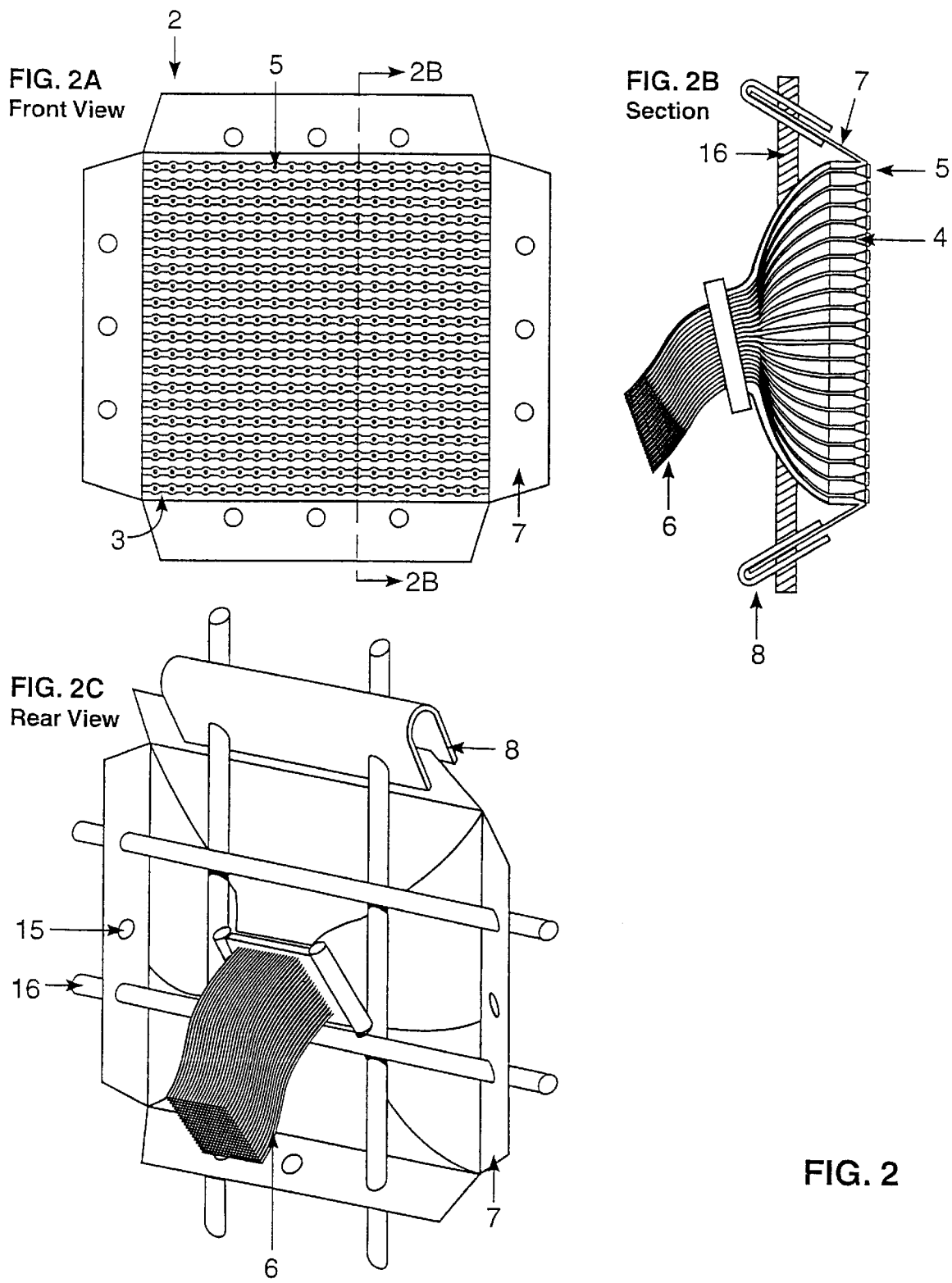
FIG. 2 shows three views—front (FIG. 2A); side (cutaway) (FIG. 2B); and rear perspective view (FIG. 2C) of a specific embodiment of the present invention.

The present invention is an LSD comprised of a matrix or array of tiles. An exemplary multiply-contoured optical display (1) is illustrated in FIG. 1. Each display consists of a plurality of equally sized tiles (2) adjoined to each other and/or a structural frame (14), in rows and columns, and supported by flexible support rods (16), as may be viewed in FIG. 3. FIGS. 2A–C are referred to in the following description of the display tiles. Each display tile (2) is assembled from parts made of injection-molded plastic, ABS, polycarbonate, or other material appropriate to the environmental conditions in which the display will be deployed. The size of each tile (2) is sufficiently small as to allow the radius of curvature required to contour the display in the desired fashion, with smaller tiles (2) allowing a smaller radius (greater curvature). In the specific embodiment disclosed, the tile size is a 152 mm (6 in.) square, and is comprised of three distinct parts: a front piece, a lower cowl and an upper cowl, which are snapped and cemented together after the fibers are inserted into front the piece, as is standard in the art. The lower and upper cowls, in addition to protecting the fibers, serve as a strain relief for the fiber bundle (6) The display surface (3) of each tile is perforated by a matrix of concave orifices (4) into which the distal fiber optic ends (5) terminate as may be viewed in FIGS. 2A and 2B. The half-angle of the concave orifices (4) must correspond to the numerical aperture (NA) of the fiber used, such that the cone of light emitted from the distal fiber (5) end is not occluded or limited. The fiber optic strands are collected into a pigtail (6) and are run out of the rear of the enclosed tile (2) as shown in FIGS. 2B and 2C. The tile assembly (2) is then filled with expanding foam that serves to both insulate and protect the fiber optic strands enveloped therein. On the surface of the display (3), the fiber terminals (5) are located so that they are slightly recessed with respect to the tile surface as is illustrated in FIG. 2B, and are affixed with optical epoxy (e.g., EpoTek 301). A light-shaping diffusion film, preferably a holographic diffusion film with very high optical transmission and low back-scattering, is then applied to the display surface (3) of each tile (2). The diffusion film is stamped out in such a manner as to leave approximately 30% of the tile surface exposed, as illustrated in FIG. 2A. Exposing greater or lesser percentages of the tile with the holographic diffusion film relates to the application of the display. For example, indoor displays requiring higher pixel densities may have up to 100% of the tile surface covered by the holographic film. The base material chosen for the tile (2) must be black, with a matte or stippled surface in order to enhance the contrast of the display by absorbing ambient light. Alternatively, a translucent or light-diffusing material may be used for the base material. In this case, black, light-absorbing material may be adhered, or silk-screened onto the tile surface to achieve the same effect as illustrated in FIG. 2A. The pitch or spacing between adjacent distal fiber ends (5) is determined by the application, so that displays to be used for proximal viewing will have a higher pixel density than displays used for viewing at a distance. In the specific embodiment disclosed, the display surface (3) is designed with a matrix of orifices spaced 4 mm on center, so that pixel pitches in multiples of 4 mm may be used (e.g., 4 mm, 8 mm, 16 mm, etc). The present invention uses a uniform 8 mm on center pitch in both the vertical and horizontal axes The distal fiber ends (5) on the perimeter of the tile are situated half of the pixel pitch, or 4 mm, from the tile edge, so that when several tiles are joined, the 8 mm pitch is preserved. Each tile (2) is designed with tabs (7) along each of its four sides (edge tiles may have only three tabs and corner tiles only two tabs) as shown in FIG. 2. The tabs, (7) although part of each tile (2), are flexible. Each tile (2) is joined to its four (or three) neighboring tiles by means of a clip (8) which are inserted around and slid over adjacent tabs. Alternatively, several different clip widths can be made which "force" the adjoining tiles to be disposed at specific angles.

Figure 6:
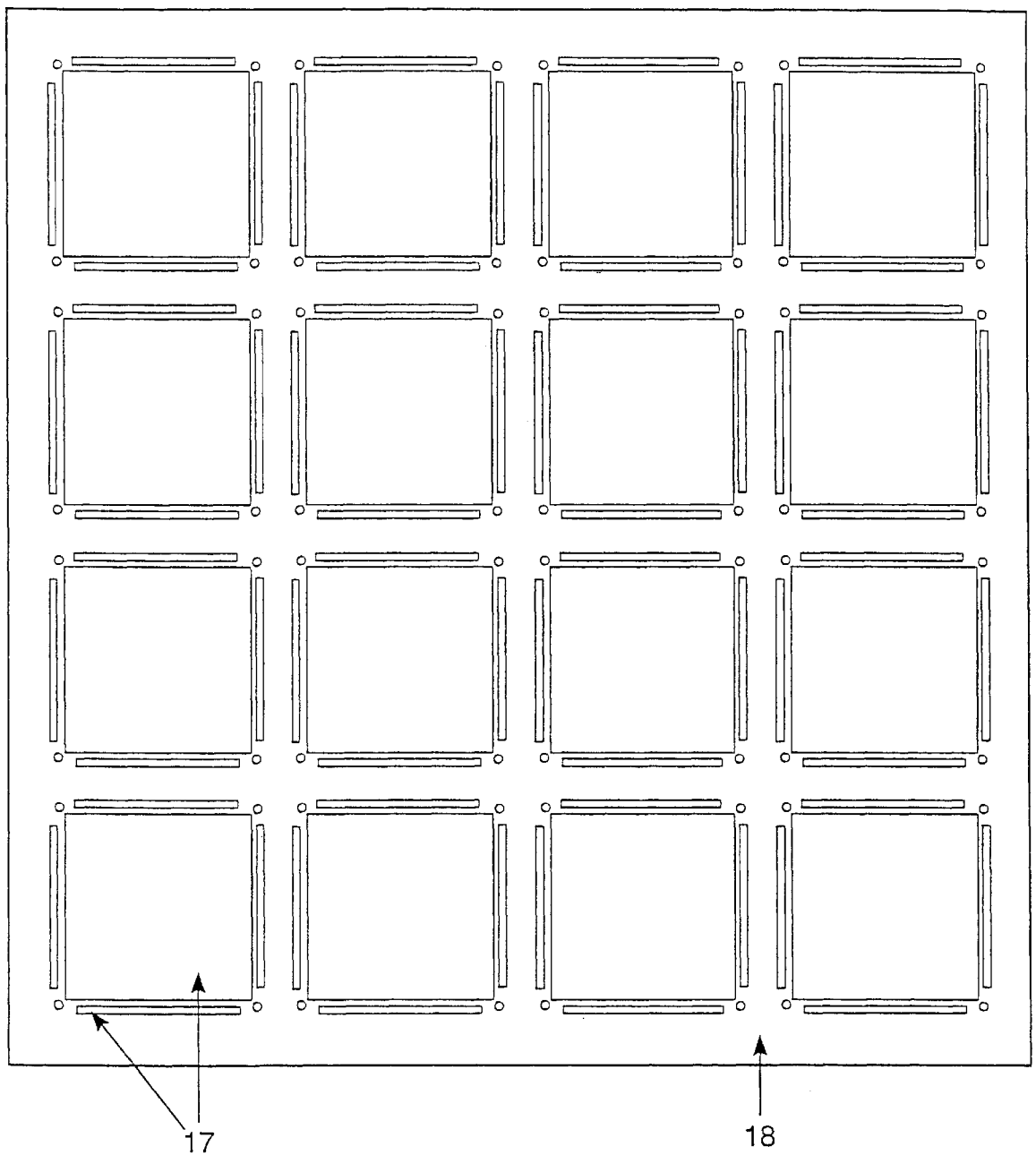
FIG. 6 shows how a piece of material can be cut out to form an interstitial webbing that can be used to hold display tiles in proximity in a secondary, embodiment of the present invention.

Optionally, in a secondary embodiment of the invention, an interstitial fabric webbing (18) can be used to semi-permanently locate each tile in proximity to its neighbors as is illustrated in FIG. 6. In FIG. 6, the white areas (17) correspond to the portion of the material that is cut out, while the shaded areas (18) correspond to the material itself. During assembly of the tiles, the front piece of each tile is placed in front of the material (18), the tabs (17) and locator pins inserted through the material, and then the two rear cowl pieces are snapped and cemented onto the front piece as is standard in the art. Such a webbing (18) facilitates a more rapid set-up and tear-down of the display if it is to be used for a temporary application. To further aid in rapid set-up and take-down of the display, an optical coupler (20) may be used where the fiber bundle emerges from the rear of the tile as illustrated in FIGS. 7A and 7B. The optical coupler (20) is attached to each fiber bundle (6) by means of a collar which has a mating attachment fixed to the rear of the display tile assembly (2), as may be viewed in FIGS. 3 and 4E. By separating the fiber bundle from the display tile, a matrix of display tiles joined by interstitial webbing (18) may be folded in the same fashion as a map. Efficient optical coupling between fiber bundles is achieved by the use of spherical, refractive, or diffractive microlens arrays such as are known by those skilled in the state of the art. The fiber bundles may be color coded according to length, and each bundle may be marked so as to make clear its orientation.

Figure 3:
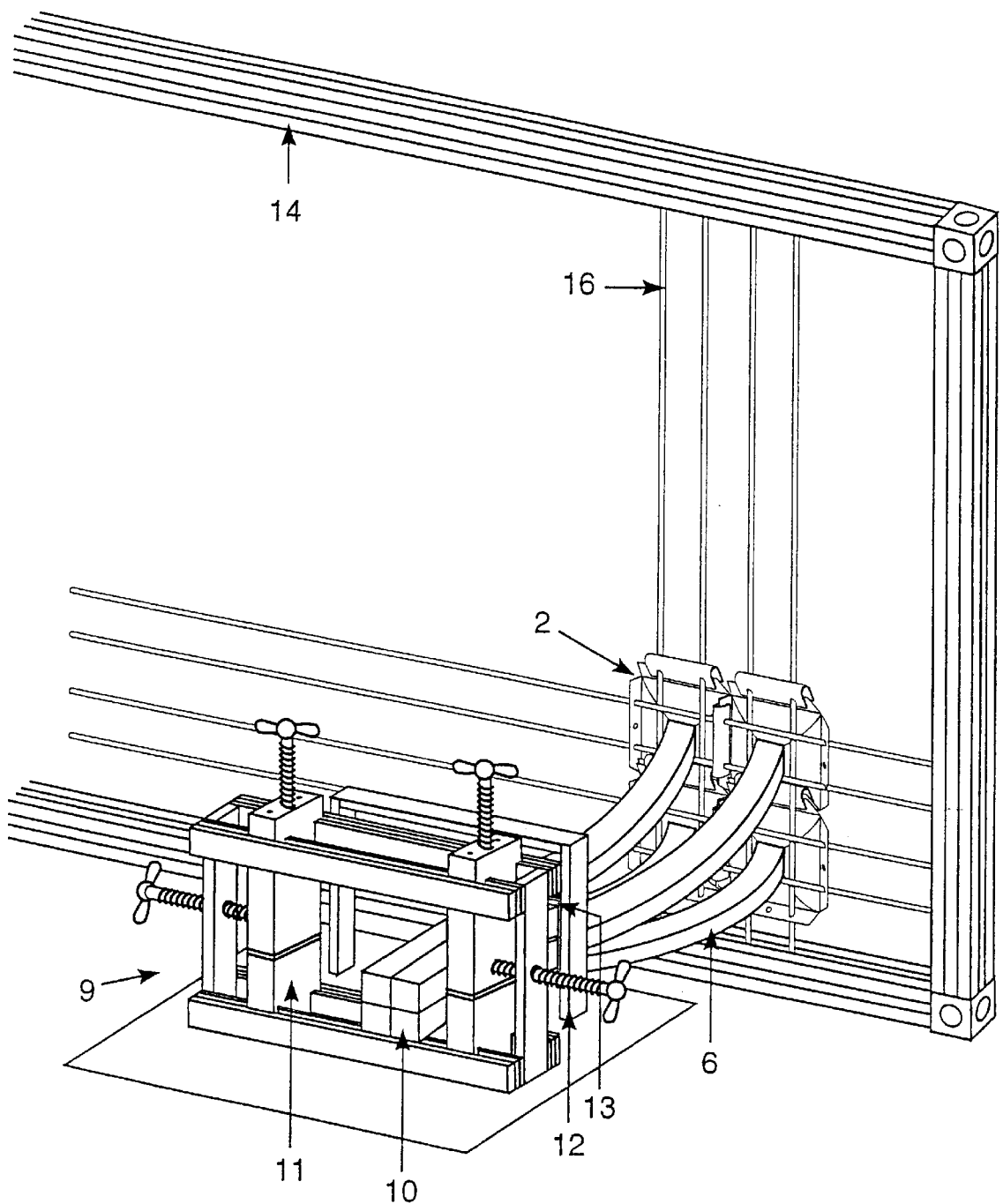
FIG. 3 shows a rear perspective view of a modular display, showing the relationship between display tiles and their corresponding inputs.
Figure 4:
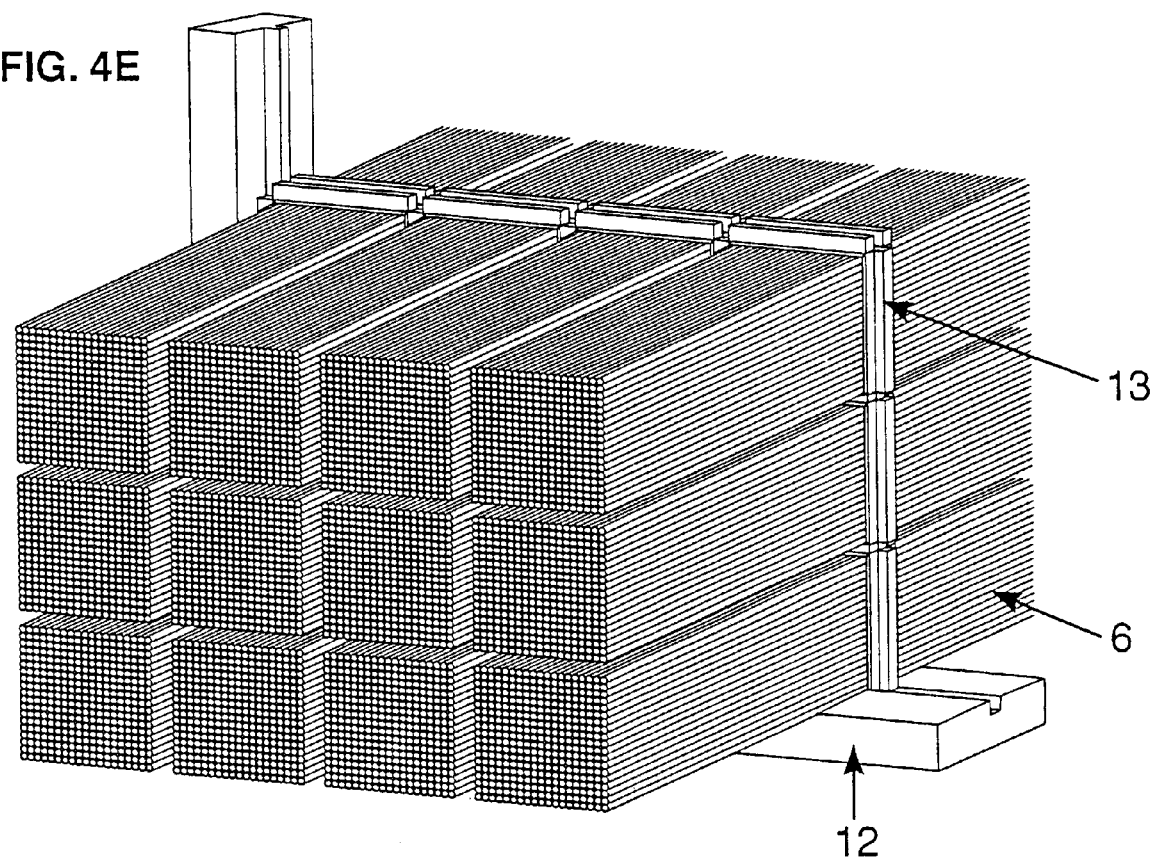
FIG. 4 shows five views; a front/back (FIG. 4A); side (FIG. 4B); top (FIG. 4C); and perspective (FIG. 4D) of the design of the fiber bundle collars used in the secondary input matrix.
Figure 5:
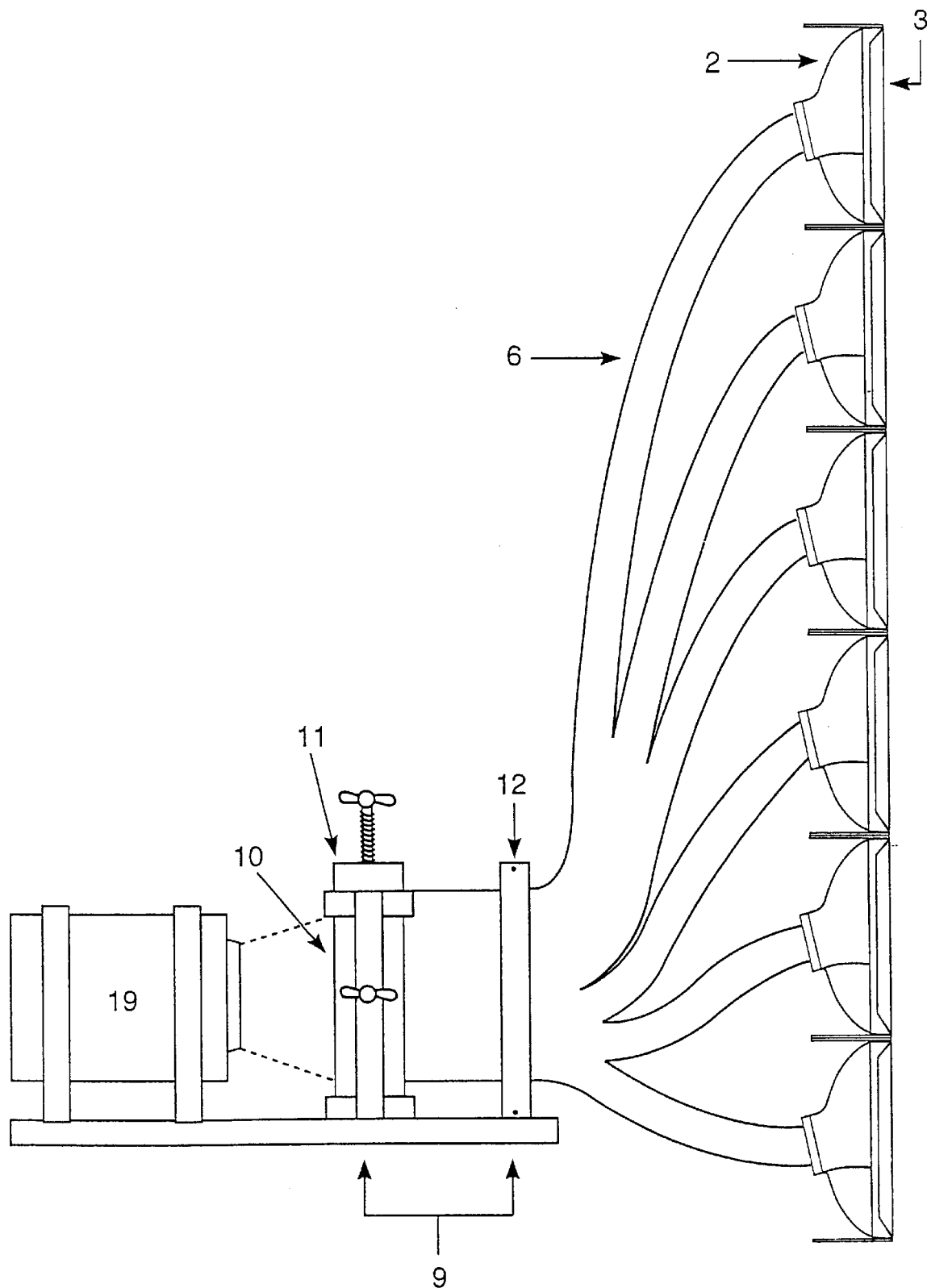
FIG. 5 shows a block diagram of a complete LSD system, including projector, primary and secondary input matrices, and display surface.

The fiber pigtail (6) emerging from the rear of each tile (2) is jacketed so as to protect the fibers from damage. The fiber pigtails are then collected into a dual input matrix assembly (9) which collectively forms the projection surface (10) as shown in FIGS. 3 and 5. The primary input matrix assembly (11) is designed in such a way as to allow for two degrees of freedom, such that a wide range of display sizes and formats (e.g., 3:4 or letterbox) can be accommodated. A secondary input matrix (12) interposed between the display tiles and the primary input matrix (11), limits the motion of the fiber pigtails (6) in the direction longitudinal to the path of light through the system. This is achieved by affixing a collar (13) at a fixed distance from the polished end of each fiber pigtail as show in FIGS. 4A–E. The collars (13) consist of male and female tabs that lock together so that all of the collars (13) are coplanar. This aspect of the dual input matrix assembly (9) is essential in that if the fiber pigtail input ends are not coplanar, any image projected onto the projection surface (10) will have segments that are out of focus. The input matrix assembly (9) maybe disposed at any angle or position relative to the display (1) as constrained by the location of the display installation.

A structural frame (14) may be used in non-permanent applications as may be viewed in FIG. 3. Such a frame (14) may be constructed of extruded or tubular aluminum, plastic, or other suitable material. Each display tile (2) has a series of vertical and horizontal locator passages (15) through which flexible locator rods (16) pass. Alternatively, the locator passages can be formed into the clips (7) that are used to attach adjoining tiles as shown in FIGS. 2B, 2C, and 3. The locator rods (16) can then be attached to the top, bottom, and two sides of the structural frame as illustrated in FIG. 3. The projection device (19) and other electronics are disposed in a separate enclosure from the display. After the display is assembled, the projector assembly is mounted to the input matrix assembly (9), as may be viewed in FIG. 5.

Summary and Claims

The fiber optic display screen of the present invention provides a novel method for forming modular contoured or planar displays from small, inexpensive tiles, while still maintaining uniform viewing from any position or angle. Moreover, the display is rugged and portable. Although specific embodiments are disclosed herein, such embodiments are not intended to limit the scope of the following claims.

I claim:

1. A contoured optical display, comprising:
    a plurality of tiles, each tile including a display surface;
    a dual input matrix assembly;
    a bundle of fiber optic strands associated with each of the tiles, each strand having two ends, with one end of each strand terminating at its associated tile and the other end of each strand received by the input matrix assembly;
    a structural frame comprising a plurality of rods which provide stability for the tiles; and
    a projector positioned to project spatially modulated light images onto the input matrix assembly.

2. The display of claim 1 in which each display surface is partially or fully covered by a light-diffusing or light-shaping film.

3. The display of claim 2 in which the fiber optic strands are in optical communication with the display surface of their associated tiles so that a point of light emitted from the projector and conveyed through a fiber optic strand may be enlarged by the light-diffusing or light-shaping film.

4. The display of claim 1 in which the bundle of fiber optic strands is collected into one or more pigtails.

5. The display of claim 4 in which each pigtail may be connected to and disconnected from the tiles by an optical coupler.

6. The display of claim 1 in which the projector comprises a spatial light modulator.

7. The display of claim 1 in which the dual input matrix assembly comprises:
    a primary assembly for forming a projection surface along a plane, the primary assembly comprising a plurality of pigtails formed into a matrix; and
    a secondary assembly that restricts the movement of the pigtails in a direction substantially perpendicular to the plane formed by the projection surface.

8. The display of claim 1 in which the dual input matrix assembly receives a plurality of fiber optic strands from said tiles, the strands being distributed in a regular array corresponding one-to-one to the arrangement of the tiles, such that the strands and their associated tiles can be removed and replaced.

9. The display of claim 1 in which the structural frame comprises tubular or extruded metal or plastic elements to which are attached locator rods.

10. The display of claim 1 in which the tiles are square, rectangular, or polygonal in shape, have a plurality of sides, and have a flexible tab or clip on each side.

11. The display of claim 1 further comprising a connecting means for connecting the tiles, wherein the connecting means includes flexible tabs and clips.

12. The display of claim 1 further comprising connecting means for connecting the tiles, wherein the connecting means includes an interstitial webbing of plastic, canvas, or other fabric or material.

13. The display of claim 1 in which each tile is formed to allow for a range of pixel densities so that the optical display may be used for a variety of display applications.

14. A multiply-contoured optical display comprising:
    a plurality of tiles that are demountably attached to each other; a display surface including a light-diffusing or light-shaping film;
    a dual input matrix assembly connected to said tiles by optical fibers, the fibers grouped into pigtails for the purpose of conveying and enlarging images, the dual input matrix assembly including a primary assembly for forming a projection surface comprising a plurality of pigtails formed into a grid and a secondary assembly that restricts the movement of the pigtails in a direction substantially perpendicular to the plane formed by the projection surface;
    a plurality of orifices in the display surface, the orifices positioned to receive the fibers such that each orifice receives light from one of the fibers;
    a structural frame comprising a plurality of locator rods; and
    a spatial light modulator positioned to convey moving or static images to the dual input matrix assembly.

15. The display of claim 14 further comprising an optical coupler for connecting or disconnecting said fibers and said tiles.

16. A multiply-contoured optical display comprising:
    a plurality of tiles attached to each other by an interstitial webbing;
    a display surface including a light-diffusing or light-shaping film and a plurality of orifices;
    a dual input matrix assembly connected to said tiles by optical fibers grouped into pigtails for the purpose of conveying and enlarging images, said fibers recessed in orifices such that light from each fiber is enlarged by the diffusion film, said dual input matrix assembly including a primary assembly for forming a projection surface comprising a plurality of pigtails formed into a grid and a secondary assembly that restricts the movement of the pigtails in a direction substantially perpendicular to the plane formed by the projection surface;
    a structural frame comprising locator rods attaching to the tiles; and a spatial light modulator positioned to convey moving or static images to the dual input matrix assembly.

17. The display of claim 16 further comprising an optical coupler for connecting or disconnecting said fibers and said tiles.

* * * * *